United States Patent [19]

Scholz et al.

[11] Patent Number: 4,531,605
[45] Date of Patent: Jul. 30, 1985

[54] ARRANGEMENT FOR DRIVING THE GENERATOR OF A VEHICLE, IN PARTICULAR A PASSENGER AUTOMOBILE

[75] Inventors: Romanus Scholz; Paulus Heidemeyer; Peter Hofbauer, all of Wolfsburg, Fed. Rep. of Germany

[73] Assignee: Volkswagenwerk Aktiengesellschaft, Wolfsburg, Fed. Rep. of Germany

[21] Appl. No.: 415,557

[22] Filed: Sep. 7, 1982

Related U.S. Application Data

[63] Continuation of Ser. No. 144,566, Apr. 28, 1980, abandoned.

[30] Foreign Application Priority Data

Apr. 26, 1979 [DE] Fed. Rep. of Germany ....... 2916816

[51] Int. Cl.$^3$ .................................................. B60K 9/00
[52] U.S. Cl. ................................... 180/165; 180/65.2; 310/67 R
[58] Field of Search ...................... 180/165, 65.4, 65.3, 180/65.1, 65.2; 310/67 R

[56] References Cited

U.S. PATENT DOCUMENTS

| | | | |
|---|---|---|---|
| 3,858,674 | 1/1975 | Tabor | 180/165 |
| 3,870,116 | 3/1975 | Seliber | 180/165 |
| 3,888,325 | 6/1975 | Reinbeck | 180/65.2 |
| 4,021,690 | 5/1977 | Burton | 310/67 R |
| 4,165,795 | 8/1979 | Lynch et al. | 180/65.1 |
| 4,282,947 | 8/1981 | Kemper | 180/165 |

FOREIGN PATENT DOCUMENTS

| 1197761 | 3/1966 | Fed. Rep. of Germany . | |
| 153431 | 12/1979 | Japan | 180/165 |

Primary Examiner—Joseph F. Peters, Jr.
Assistant Examiner—Michael Mar
Attorney, Agent, or Firm—Brumbaugh, Graves, Donohue & Raymond

[57] ABSTRACT

A vehicle having an engine which is stopped during selected operating states and a generator having counterrotating members. One of the counterrotating members is connected to the engine and the other counterrotating member is connected to the wheels of the vehicle. The generator may be driven by either the engine or the wheels.

5 Claims, 5 Drawing Figures

ARRANGEMENT FOR DRIVING THE GENERATOR OF A VEHICLE, IN PARTICULAR A PASSENGER AUTOMOBILE

This is a continuation of application Ser. No. 144,566, filed Apr. 28, 1980, now abandoned.

BACKGROUND OF THE INVENTION

The present invention relates to an arrangement for driving the generator of a motor vehicle, in particular a passenger automobile.

In conventional motor-driven vehicles, the generator is connected to the engine and is driven during the entire time of operation of the vehicle, since the engine is always running, even during idling and engine braking operations. Recently, driving systems have been proposed in which at defined operational states, such as during idling and engine braking operations, the engine is stopped by disconnection from its flywheel. See, for example, commonly owned U.S. Pat. No. 4,252,208. While an engine operated in this manner is greatly desirable, due to the increased fuel efficiency and reduced level of pollutants, at times when the engine is stopped, the generator is also not driven which presents the possibility that the electrical network on board the vehicle is not supplied with sufficient energy, that is, the battery can run down, especially if the battery is used from time to time to keep the flywheel in motion.

SUMMARY OF THE INVENTION

The present invention is an arrangement for driving the generator even during periods in which the engine is disconnected but the vehicle is still in motion.

More particularly, in accordance with the invention the generator is coupled to the driving wheels of the vehicle so that, in addition to being driven by the vehicle engine, it can also be driven, selectively, by the driving wheels of the vehicle. Preferably, during operating states when the vehicle is moving but the engine is stopped, the generator can be driven from a shaft of the vehicle transmission. In this manner it is ensured that the generator is still driven when the engine has stopped but the vehicle is in motion, in particular when the vehicle is in an engine braking operation, so that the electrical system on board the vehicle is sufficiently supplied, and the battery will not be drained.

Instead of driving the generator through the crankshaft of the engine (using a drive shaft extending through a hollow transmission main shaft), in another embodiment the armature of the generator is driven from two sides in the same direction or rotation, one side being connected with the crankshaft of the engine and the other side being connected with a shaft of the transmission. In this embodiment, one or the override clutches is interposed between one side of the armature shaft and the crankshaft, and the other override clutch is interposed between the other side of the armature shaft and the transmission shaft, so that only the faster rotating shaft (i.e. either from the crankshaft or the transmission) will drive the armature at any given time.

In another embodiment for driving a generator in accordance with the invention, the armature and the magnet housing of the generator are both rotatable (in opposite directions) and one is connected to the crankshaft and the other is connected to the driving wheels. In this embodiment, when both the engine is operating and the vehicle is moving, the armature and magnetic housing both are driven to rotate in opposite directions. Even if the engine stops and the armature (for example) would thereby stop, the driving wheels (in a moving vehicle) would continue to rotate the magnetic housing. In this manner, again there is obtained a drive for the generator which operates off both the driving engine and the driving wheels, and moreover, in cases in which both drives are in operation, the effect of driving the generator is additive, that is, the effective rpm of the generator is the engine drive rpm plus the rpm of the driving wheels drive (e.g., through a transmission shaft).

In another embodiment, the armature of the generator is connected with the flywheel, which is arranged between the engine and the transmission and disconnectable from the engine and the gear mechanism by means of clutches interposed in the drive train. In this embodiment as well, the generator may be driven by means of the engine as well as the driving wheels, through the transmission, through the corresponding control of the clutches. Moreover, in this arrangement of the flywheel, which is described more fully in the aforementioned U.S. application Ser. No. 955,186, it is possible to disconnect the flywheel from both the engine and the transmission, such that the flywheel continues to rotate when both the engine is stopped and the vehicle is motionless. In accordance with this embodiment of the present invention, then, it is possible to charge the battery and supply the electrical system even when both the engine and vehicle are stopped, as long as the flywheel continues to rotate.

DETAILED DESCRIPTION OF THE PREFERRED EMBODIMENTS

Figure 1:
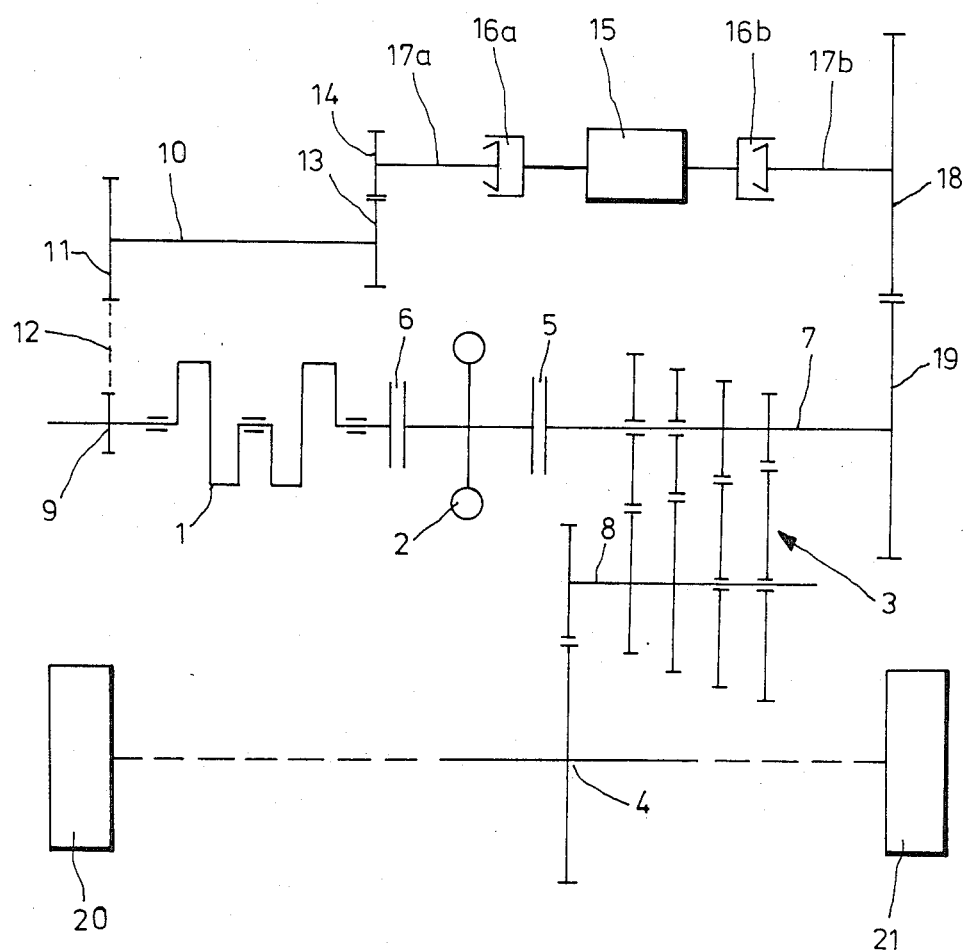
FIGS. 1-5 are schematic illustrations of five preferred embodiments of the invention.

In the figures, identical reference marks designate common components in the various embodiments. A vehicle includes a crankshaft 1 of a conventional reciprocating piston engine. A flywheel 2 follows the crankshaft 1 and a transmission, generally designated as 3, includes a plurality of selectable gear ratios for adjustment of the torque transmission from the engine to the driving wheels as a function of the operating state of the automobile. An axle drive 4 is connected to the transmission output shaft 8 to transmit torque to the two driving wheels 20 and 21 of the vehicle.

A first clutch 5 is arranged between the flywheel 2 and the transmission 3, and a second clutch 6 is interposed between the crankshaft 1 and the flywheel 2. By corresponding control of the said clutches 5 and 6, during engine braking operation of the vehicle the flywheel 2 is driven by the driving wheels 20, 21 through the transmission 3 and the engine is stopped by disengagement of the clutch 6. If both clutches 5 and 6 are disengaged, the engine stops but the flywheel 2 continues to rotate to store kinetic energy. The stopped engine can be started again at any time by re-engagement of the clutch 6 using an appropriate starting drive arrangement, and thus the stopped engine is always in a ready state to be re-started. Such a ready state, which permits the engine to be stopped and readily re-started, is useful, e.g. at times when the vehicle is in stop-and-go traffic at which times the engine, if required to idle, would use up fuel and emit pollutants.

The transmission 3 includes a main shaft 7 and an output shaft 8. A driving wheel 9 is fixed on the front end of the crankshaft 1 for driving the camshaft 10 of the engine. For this drive a V-belt or a toothed belt 12 may be employed which is looped around a pulley 11 of the camshaft 10.

Referring to the embodiment illustrated in FIG. 1, a generator 15 is driven firstly by means of the camshaft 10. A spur gear 13, fixed on the end of the camshaft 10, meshes with a second spur gear 14 fixed on a generator drive shaft 17a (for rotating, e.g. the armature). A second generator drive shaft 17b (also connected to the armature) extends from the other side of the generator 15 and is driven by a pair of spur gears 18 and 19, one of which 19 is connected on the main shaft 7 of transmission 3. A pair of override clutches 16a and 16b, which interrupt the drive connection between the drive end and the driven end as long as the driven end rotates faster than the drive end, are interposed between the generator 15 and the camshaft and transmission drives, respectively, for example in drive shafts 17a and 17b, in order to drive the generator 15 optionally through the engine crankshaft 1 or the driving wheels 20, 21. Using the override clutches 16a and 16b, only when the speed of the drive end equals that of the driven end will clutch engagement occur and a torque take-over be effected. In this manner, the generator 15 will at all times be driven by the drive shaft 17a or 17b rotating at a greater speed. In particular during engine braking, for example when the vehicle is rolling down an incline, the engine (and thereby shaft 17a) are stopped through disengagement of the second clutch 6, but the wheels 21 and 22 continue to rotate. If one of the forward gears is engaged, rotation of the wheels 20, 21 causes shaft 8, connected by way of axle 4, to rotate transmission shaft 7. Gears 19 and 18 are therefore driven, which drives shaft 17b and, therefore, the generator 15 (through clutch 16b).

In a variation of the embodiment shown in FIG. 1, the generator drive shaft 17b may also be driven by the output shaft 8 of the transmission. As opposed to driving the generator off the main shaft 7, in which (with the engine off) the driving wheels 20, 21 rotate the generator only when the transmission is in gear (and not while in neutral), when the generator is connected to the transmission output shaft 8 the generator input shaft 17b would rotate whenever the vehicle was moving, with an rpm independent of the selected transmission gear. In this arrangement of the generator drive, however, the connection to the output shaft 8 must be made so that, as in the case of the embodiment shown in FIG. 1, the generator drive shafts 17a and 17b, one being driven through the crankshaft 1 and one being driven through the vehicle wheels, still drive the generator (armature) shaft in the same direction. This may be done, for example, by using a V-belt drive in place of the gear drive (18, 19).

Figure 2:
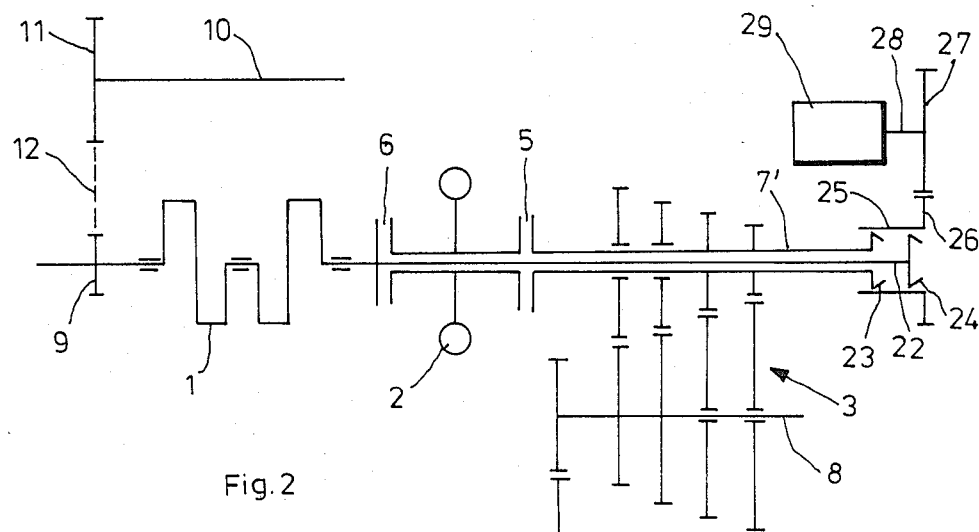

FIG. 2 illustrates another embodiment of the generator drive in which the said drive off the crankshaft 1 is not obtained over the camshaft 10 but over a drive shaft 22 passing through a hollow main shaft 7' of the transmission 3. An override clutch 24 is arranged at the end of the drive shaft 23 axially side by side with an override clutch 23 on the end of the main shaft 7'. Both override clutches 23 and 24 act on a common hub 25, connected over a pair of spur gears 26 and 27 to the input shaft 28 of the generator 29.

Figure 3:
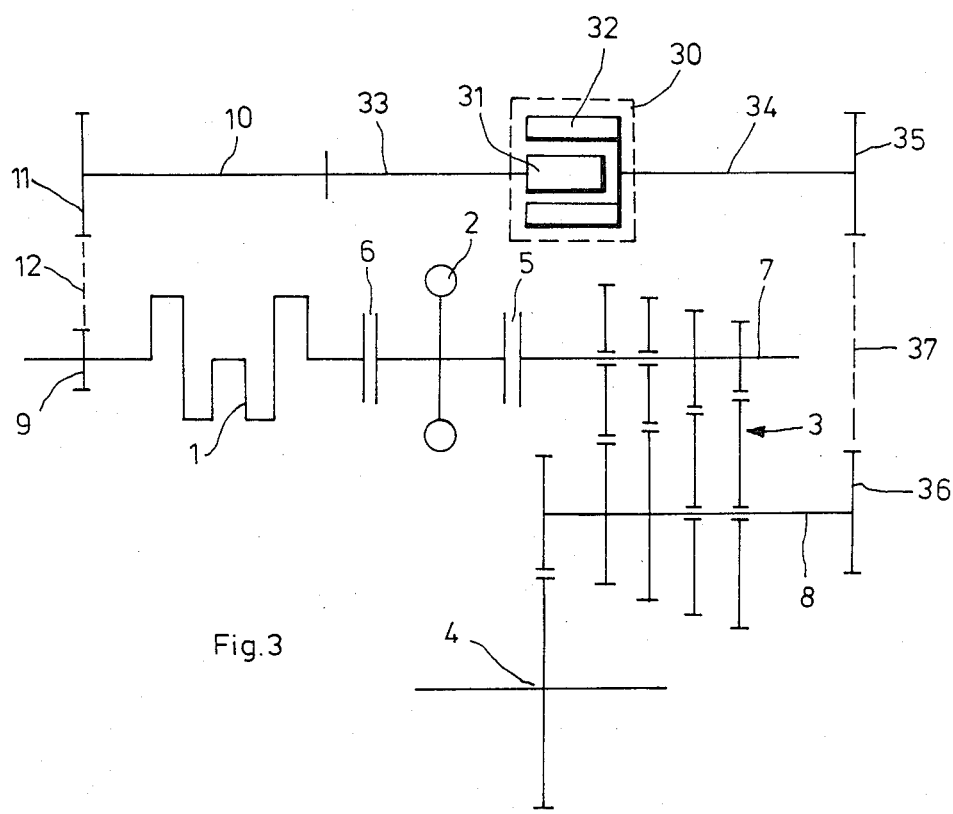

FIG. 3 illustrates a third embodiment of the invention in which the generator 30 is driven from two sides, the armature 31 and the magnet housing 32 of the generator 30 being driven in opposite directions of rotation. The armature 31 is directly connected with the camshaft 10 over a drive shaft 33. The magnet housing 32 is rotated by input shaft 34, driven in turn by the output shaft 8 of the transmission 3 by a toothed belt or V-belt 37 connecting pulleys 35 and 36. In place of the belt drive, the input shaft 34 of the generator may be driven by a spur gear drive off the main shaft 7 of the transmission 3. In each case, care must be taken that the directions of rotation of the input shafts 33 and 34 are opposite so that when both shafts are rotating, the generating action becomes especially favorable through addition of the shaft rpm acting on the generator components (armature 31 and housing 32).

Figure 4:
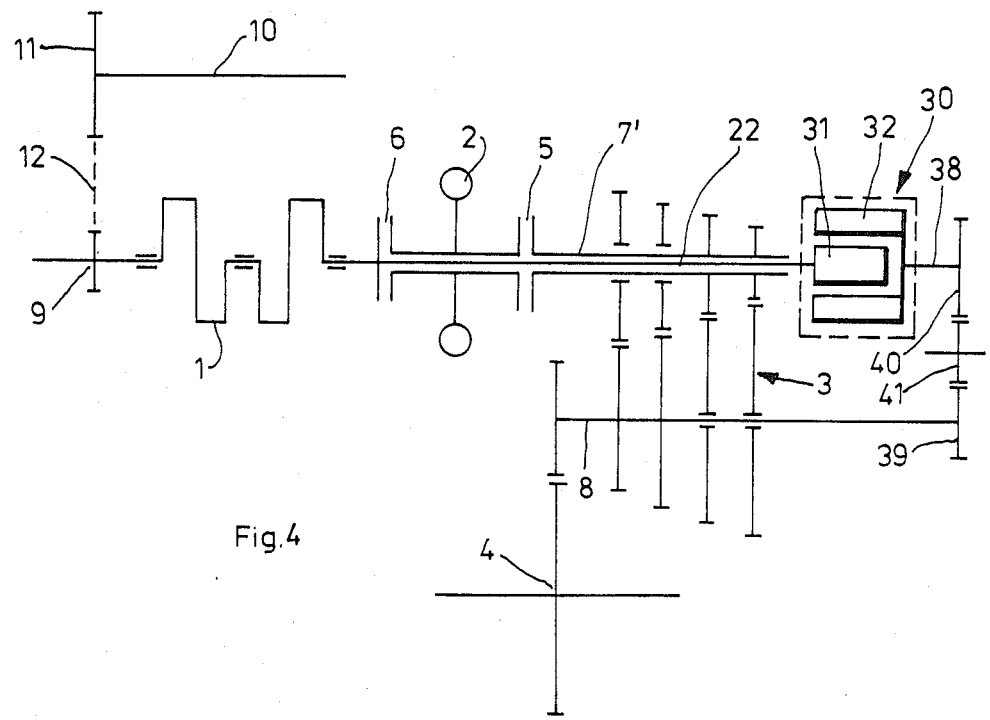

In the embodiment illustrated in FIG. 4, the generator 30 has an armature 31 and a magnet housing 32 rotating in opposite directions. The armature 31 is driven by a drive shaft 22 which extends concentrically through a hollow main shaft 7' of the transmission 3 and is connected with the crankshaft 1. The magnet housing 32 is driven through the output shaft 8 of the transmission 3. Connection may be provided by belt drive, such as shown for the embodiment in FIG. 2, or also a toothed-gear drive, in which two spur gears 39 and 40, arranged at the ends of the output shaft 8 and the magnet housing input shaft 38, mesh with an interposed intermediate gear 41, such that the directions of rotation of the armature 31 and the magnet housing 32 are opposite.

Figure 5:
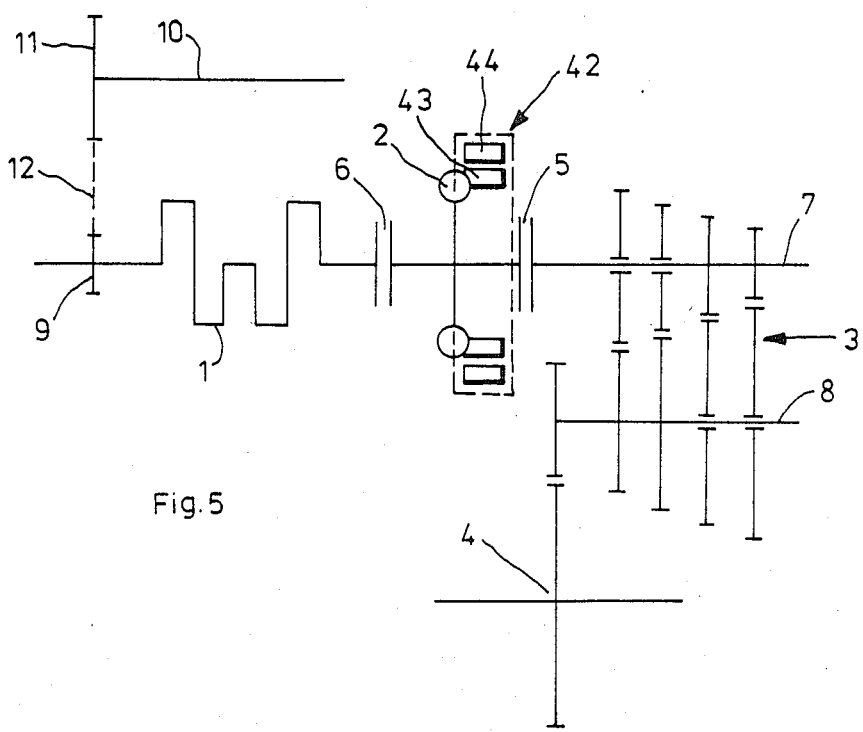

FIG. 5 illustrates an embodiment in which the generator 42 is placed in the vicinity of the flywheel 2 in such a manner that the armature 43 is integral with the flywheel 2 and rotates in a stationary magnet housing 44. Depending on whether one of the clutches 5 or 6 or, as in normal operation, both clutches are engaged, this generator 42 is driven either by the engine or, such as especially in engine braking operations (when the transmission is in gear), by the rotating drive wheels of the vehicle.

The invention has been illustrated and described with reference to the preferred embodiments thereof. Variations and modifications will be apparent to persons skilled in the art without departing from the inventive principles disclosed herein. For example, while the specification refers to apparatus for driving a generator, the term generator is to be understood to refer to generators per se, as well as alternators and so on, where a rotational drive is used to generate electrical energy. All such modifications and variations are intended to be within the scope of the invention as defined in the following claims.

We claim:
1. A vehicle comprising:
   a vehicle drive including an engine, a transmission having an input and an output, and driving wheels coupled to the output of said transmission, said drive further including at least one clutch means for selectively coupling said engine to the input of said transmission;
   a generator, solely for providing current, including first and second counterrotating members having means responsive to the rotation of either member for generating current;

first coupling means connecting said engine and the first member of said generator for rotating said first member in response to engine rotation; and second coupling means connecting said driving wheels and the second member of said generator for rotating said second member in response to rotation of said driving wheels or said engine, wherein said vehicle can assume at least a first operating state in which said engine rotates and said clutch means is disengaged while said driving wheels are stopped, and a second operating state in which said engine rotation is stopped and said clutch means is disengaged while said driving wheels are rotating, and wherein said generator is driven if either said engine or driving wheels, or both, are rotating so as to be driven in both of said vehicle operating states.

2. The improvement as defined in claim 1, wherein said transmission has a transmission shaft, and said second coupling means includes said transmission shaft.

3. The improvement as defined in claim 2, wherein said engine includes a crankshaft, said transmission has a hollow main shaft, and said first coupling means comprises a drive shaft for driving said generator connected with said crankshaft and extending through said hollow main shaft.

4. The improvement as defined in claim 1, wherein said transmission has a hollow main shaft, said engine comprises a crankshaft, and said first coupling means comprises a drive shaft for driving said generator connected with said crankshaft and extending through said hollow main shaft.

5. The improvement as defined in claim 1, 2, 3 or 4, wherein said first and second counterrotating members comprise an inner armature and an outer magnetic housing, wherein said first coupling means is connected to one of said inner armature and said outer housing and said second coupling means is connected to the other of said inner armature and said outer housing for rotating said inner armature and said outer housing in opposite directions.

* * * * *

UNITED STATES PATENT AND TRADEMARK OFFICE
CERTIFICATE OF CORRECTION

PATENT NO. : 4,531,605

DATED : July 30, 1985

INVENTOR(S) : Scholz et al.

It is certified that error appears in the above-identified patent and that said Letters Patent is hereby corrected as shown below:

Col. 1, between lines 47 and 48, insert:

--In order to make it possible for the generator to be placed in a favorable position laterally in or on the speed change gear mechanism (transmission), the generator may be driven by a drive shaft connected with the engine crankshaft, which extends concentrically through a hollow main shaft of the transmission. The drive shaft connected to the engine crankshaft then functions as a first drive for the generator, to rotate the generator armature when the engine is on, and the hollow main shaft of the transmission functions as the second drive for the generator (rotating whenever the vehicle is moving).

--In order to permit the generator to be driven (selectively) both by the engine and by the driving wheels, override clutches are arranged in the drive connections of the generator with the engine and with the driving wheels. In this manner a connection for driving the generator may be obtained as desired, either with the driving engine or the driving wheels, whereby the override clutch in the other driving connection then interrupts the connection.

--In the embodiment described above wherein the drive shaft connected with the crankshaft extends concentrically in a hollow main shaft of the transmission, the two overdrive clutches may be arranged axially side by side and connect the two shafts with an input shaft leading to the generator.--

Col. 1, line 52, "or" should read --of--; and

UNITED STATES PATENT AND TRADEMARK OFFICE
CERTIFICATE OF CORRECTION

PATENT NO. : 4,531,605

DATED : July 30, 1985

INVENTOR(S) : Scholz et al.

It is certified that error appears in the above-identified patent and that said Letters Patent is hereby corrected as shown below:

Col. 1, line 55, "or" should read --of--.

Signed and Sealed this

Third Day of December 1985

[SEAL]

Attest:

Attesting Officer

DONALD J. QUIGG

Commissioner of Patents and Trademarks